United States Patent [19]

Schmitt et al.

[11] Patent Number: 4,859,014
[45] Date of Patent: Aug. 22, 1989

[54] NON-RECIPROCAL OPTICAL WAVEGUIDE DEVICE, PARTICULARLY FOR USE AS AN ISOLATOR OR CIRCULATOR

[75] Inventors: Hans-Jürgen Schmitt, Aachen; Hans O. B. Dammann, Tangstedt, both of Fed. Rep. of Germany

[73] Assignee: U.S. Philips Corp., New York, N.Y.

[21] Appl. No.: 209,445

[22] Filed: Jun. 20, 1988

[30] Foreign Application Priority Data

Jun. 25, 1987 [DE] Fed. Rep. of Germany ....... 3720929

[51] Int. Cl.$^4$ .............................................. G02B 6/10
[52] U.S. Cl. ............................... 350/96.13; 350/96.12; 350/96.14; 350/375; 350/376; 350/377
[58] Field of Search ............... 350/96.11, 96.12, 96.13, 350/96.14, 96.30, 374, 375, 376, 377

[56] References Cited

U.S. PATENT DOCUMENTS

| | | | |
|---|---|---|---|
| 4,032,217 | 6/1977 | Coeuré et al. | 350/96.12 X |
| 4,147,979 | 4/1979 | Baues et al. | 350/96.13 |
| 4,153,328 | 5/1979 | Wang | 350/96.11 |
| 4,236,782 | 12/1980 | Castera et al. | 350/96.13 |
| 4,262,992 | 4/1981 | Berthold, III | 350/96.14 |
| 4,274,710 | 6/1981 | Nagao | 350/375 |
| 4,674,829 | 6/1987 | Bulmer et al. | 350/96.14 |
| 4,691,984 | 9/1987 | Thaniyavarn | 350/96.14 |
| 4,711,515 | 12/1987 | Alferness | 350/96.14 |
| 4,746,182 | 5/1988 | Dammann et al. | 350/96.13 |
| 4,775,206 | 10/1988 | Erman et al. | 350/96.13 |
| 4,776,656 | 10/1988 | Sanford et al. | 350/96.13 X |
| 4,798,434 | 1/1989 | Dammann et al. | 350/96.13 |

OTHER PUBLICATIONS

"Applied Optics", vol. 23, 1984, pp. 1886–1889.

*Primary Examiner*—William L. Sikes
*Assistant Examiner*—Brian M. Healy
*Attorney, Agent, or Firm*—William L. Botjer

[57] ABSTRACT

The invention relates to a non-reciprocal optical element, particularly for use an an isolator or circulator, which is connected to at least two monomode optical waveguides and which has a magneto-optical waveguide structure which is subjected to a transversal magnetic field directed perpendicularly to the direction of propagation of the optical wave. This arrangement is simplified by combining the functions of the coupler and the phase shifter, which is achieved by means of the following features:

the magneto-optical waveguide structure (1,11) is formed as a multimode waveguide which can propagate at least one fundamental mode (5) and the first-order mode (6), the optical waveguides (A,B,C,D,9,10) are off-centered with respect to the waveguide structure (1,11), the dimensions and/or the cross-sectional distribution of the refractive index of the optical waveguide structure (1,11) are chosen to be such that the two modes (5,6) have a reciprocal phase difference of $(\pi 2)+pb\ 2n\pi$ the magnetic field strength and/or the structural build-up of the magneto-optical waveguide structure (1,11) are chosen to be such that the two modes (5,6) have a non-reciprocal phase difference of $(\pi 2)+2m\pi$ in which n and m may be integers including 0.

8 Claims, 1 Drawing Sheet

NON-RECIPROCAL OPTICAL WAVEGUIDE DEVICE, PARTICULARLY FOR USE AS AN ISOLATOR OR CIRCULATOR

BACKGROUND OF THE INVENTION

The invention relates to a non-reciprocal optical element, particularly for use as an isolator or circulator, which is connected to at least two monomode optical waveguides and which has a magneto-optical waveguide structure intended to be subjected to a transversal magnetic field directed perpendicular to the direction of propagation of the optical wave.

Such a differential phase shift circulator/isolator in the structure of an optical strip line is known from "Applied Optics", Vol. 23, 1984, pp. 1886 to 1889. The incident light wave is split up into two equal parts for which purpose Y couplers or hybrid couplers are used. The two sub-waves traverse various parallel channels of the magneto-optical waveguide structure which is constructed in such a way that an optical path difference of $\lambda/4$ is produced at the entrance of the seceound coupler, which difference corresponds to a phase difference of $\pi/2$. Additionally, non-reciprocal phase shifts in the two channels of $-\pi/4$ and $+\pi/4$ are generated by corresponding transversal magnetic fields so that for one light direction the optical phase difference of $\pi/2$ is just compensated but is supplemented to $\pi$ for the opposite light direction. Based on this principle, isolators and circulators can be constructed dependent on the arrangement of the waveguides and the couplers.

The known arrangement is elaborate and particularly has a relatively large construction length determined by two separate couplers (Y or hybrid) which must be connected to the magneto-optical waveguide structure. High losses arise.

SUMMARY OF THE INVENTION

It is an object of the invention to simplify the arrangement of the type described in the opening paragraph.
This is realized by the following features:
 the magneto-optical waveguide structure is formed as a multimode waveguide which can propagate at least one fundamental mode and the first-order mode,
 the optical waveguides are off-centered with respect to the waveguide structure,
 the dimensions and/or the cross-sectional distribution of the refractive index of the optical waveguide structure are chosen to be such that the two modes have a reciprocal phase difference of $\pi/2 + 2n\pi$
 the magnetic field strength and/or the structural build-up of the magneto-optical waveguide structure are chosen to be such that the two modes have a non-reciprocal phase difference of $\pi/2 + 2m\pi$.

According to the invention, the functions of the coupler and the phase shifter are combined so that connection leads are not required.

The magnetic field strength enables a selective adaptation of the non-reciprocal phase difference. A further advantageous means is characterized in that the magneto-optical waveguide structure is adapted to be influenced by a mechanical stress acting perpendicularly to the direction of propagation of the optical wave.

Preferably the magneto-optical waveguide structure consists of yttrium iron garnet (YIG).

According to an advantageous embodiment the magneto-optical waveguide structure is provided on a substrate area and is approximately twice as wide as the monomode optical waveguides connected to it.

The manufacture of the arrangement according to the invention by means of crystalline growth on a substrate is very simple if the magneto-optical waveguide structure is provided on the substrate at a height corresponding to approximately twice the height of the monomode optical waveguides connected to it.

In the design as a circulator the magneto-optical waveguide structure is bilaterally connected to two monomode optical waveguides each. In a design as an isolator each side of the optical waveguide structure is advantageously connected to a monomode optical waveguide essentially covering a peripheral half of the cross-sectional area of the magneto-optical waveguide structure, whilst the uncovered cross-sectional areas are provided with an absorbing layer (optical waveguide termination).

A preferred solution is characterized in that a doping which is different from the neighbouring peripheral areas is applied in the central portion of the cross-sectional area of the magneto-optical waveguide structure in order to locally vary the refractive index and/or the magneto-optical constant by selectively influencing the fundamental mode.

BRIEF DESCRIPTION OF THE DRAWINGS

The invention will now be described in greater detail by way of example with reference to the accompanying drawings in which.

DETAILED DESCRIPTION OF THE PREFERRED EMBODIMENTS

Figure 1:
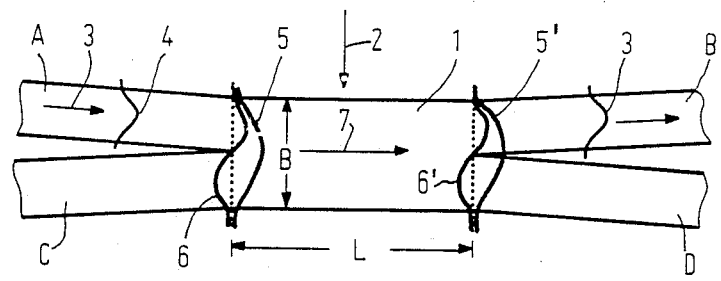
FIGS. 1 to 4 show four different modes of operating a circulator according to the invention.

In FIGS. 1 to 4 the references A, B, C and D denote monomode optical strip waveguides which are provided pairwise on either side of a magneto-optical waveguide structure 1. The waveguides A to D and the magneto-optical waveguide structure 1 are provided on an area, located in the plane of the drawing, of a substrate layer by means of crystalline growth. The waveguides A to D particularly consist of $SiO_2$ which is doped in known manner and whose refractive index is slightly larger than that of the waveguide structure which preferably consists of yttrium iron garnet (YIG) is slightly larger than that of the surrounding medium. Air may also serve as a surrounding medium.

A magnetic field influences the magneto-optical waveguide structure in the direction of the arrow 2. This influence shows down the optical wave velocities in one direction and accelerates them in the other direction, resulting in a non-reciprocal behaviour.

The dimensions L and B of the magneto-optical waveguide structure and their refractive index difference relative to the value of the surrounding medium are chosen to be such that in addition to the fundamental mode at least one further mode, which is preferably only the next higher one, can be propagated.

A linearly polarized optical wave 4 in the form of a TM mode entering the waveguide A in the direction of the arrow 3 not only excites a fundamental mode 5 with a larger field width when it enters the magneto-optical waveguide structure, but also excites at least a mode 6 of the next higher order.

FIGS. 1 to 4 show the field variations of the modes (Gaussian waves) diagrammatically and not to scale. Therefore, particularly the relative field variations at the entrance and exit faces of the magneto-optical waveguide structure 1, which faces are shown in broken lines, can be elucidated.

In FIG. 1 the two modes 5 and 6 with the same relative field distribution arrive at the exit end of the magneto-optical waveguide structure 1 as modes 5' and 6', respectively, so that a mode 3' is only passed on in the waveguide B, whereas the waveguides C and D are substantially field-free because the field resulting from the two modes 5 and 6 and 5' and 6' is substantially "zero" at their entrance faces. This effect is based on the dimensioning according to the invention of the magneto-optical waveguide structure 1. By suitable choice of the dimensions L and B and the refractive index difference with the surrounding medium different velocities result for the two modes 5 and 6, which yield a phase difference of $+(\pi/2+2n\pi)$ over the length L, in which n is an integer including 0.

This effect is reciprocal, i.e. it is independent of the direction of the optical wave. Additionally, the magnetic field 2 results in the two modes 5 and 6 propagating in the direction of the arrow 7 to have a non-reciprocal phase difference of $-(\pi/2+2m\pi)$ in which m is an integer including 0. Non-reciprocal is understood to mean that the sign of this phase difference in the opposite direction is reversed so that a non-reciprocal phase difference of $+(\pi/2+2m\cdot\pi)$ is then the result.

In the case of FIG. 1 the resultant phase difference is
$+(\pi/2+2\,n\cdot\pi)-(\pi/2+2\,m\cdot\pi)=2\,(n-m)\cdot\pi$,
so that the relative field distribution of the two modes 5 and 6 at the beginning and the end of the magneto-optical waveguide structure 1 is equal. This strictly applies to a given wavelength of the optical waves. For different wavelengths, for example, lengths L to be accordingly changed and adapted should be chosen.

Figure 2:
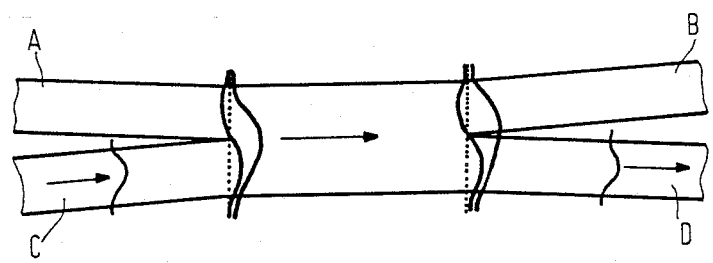
Figure 3:
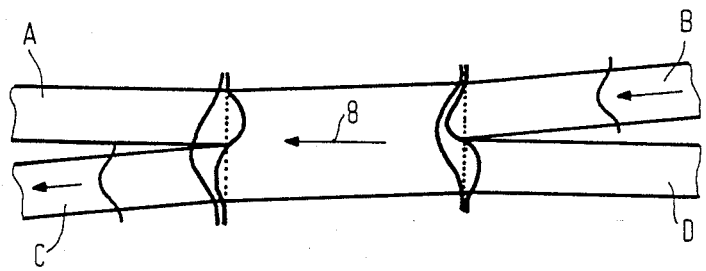
Figure 4:
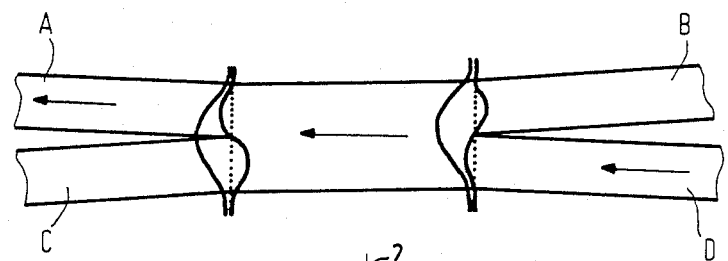

In analogy with FIG. 1 the result in FIG. 2 is that when applying a polarized optical wave to the monomode waveguide C only one wave is passed on in the waveguide D. When introducing an optical wave in the waveguide B according to FIG. 3 or D according to FIG. 4 it leaves the crossed facing waveguides C and A, respectively. As compared with FIGS. 1 and 2 the direction 8 of the optical wave in the magneto-optical waveguide structure 1 is reversed so that the resultant phase difference between the two modes is now
$+(\pi/2+2n\pi)+(\pi/2+2m\pi)=\pi+2\,(n+m)\cdot\pi$
Therefore the relative field distribution at the beginning and at the end of the magneto-optical waveguide structure 1 in the manner shown in FIGS. 3 and 4 is different.

The circulator shown diagrammatically in FIGS. 1 to 4 is suitable, for example, for use in a backscattering measuring device (OTDR) for estimating the attenuation of light waveguides. For example, the light waveguide to be measured can be coupled to the waveguide B. Laser light is passed into the waveguide A and reaches the light waveguide via the waveguide B in accordance with FIG. 1. Light backscattered from the light waveguide to the waveguide B reaches an optical detector via the waveguide C in the manner shown in FIG. 3. On the other hand interference light does not reach the laser because substantially no field generated by backscattering light is excited in the waveguide A.

Figure 5:
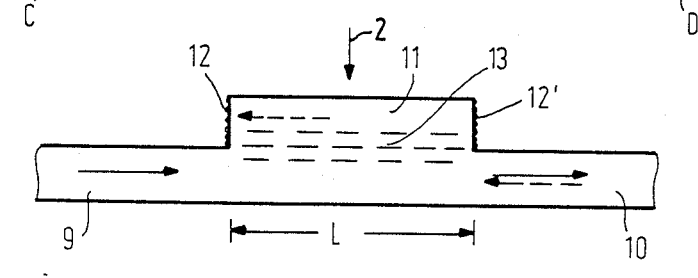
FIG. 5 shows a modification of an arrangement according to the invention, formed as an isolator.

Circulators may conventionally be used as optical isolators, as is shown in FIG. 5.

An isolator effect also results when the waveguides C and D in FIG. 1 and the waveguides A and B in FIG. 2 are replaced by absorbing coatings of the magneto-optical waveguide structure 1. The light can then pass from the left to the right, i.e. in the direction of the arrow 7, but not in the opposite direction from the right to the left, i.e. in the direction of the arrow 8.

In the arrangement shown in FIG. 5 the monomode waveguides 9 and 10 and the magneto-optical waveguide structure 11 are provided by means of crystalline growth on a substrate area extending perpendicularly to the plane of the drawing. Otherwise the same physical effect as in the arrangement shown in FIGS. 1 to 4 is obtained.

An optical wave introduced into the waveguide 9 is passed on in the waveguide 10. However, a part of this wave, which is for example reflective (broken line arrows), does not return to the waveguide 9 (comparable with FIG. 4) but is absorbed by the coating 12 which functions as an optical waveguide termination. Such an isolator could advantageously be arranged between the pigtail of a transmission laser and an outgoing light waveguide.

FIG. 5 shows grown layers 13 whose refractive index and/or magneto-optical constant in this central area deviate from the values of the neighbouring areas. This provides the possibility of selectively adjusting reciprocal and non-reciprocal phase differences for the two modes. Measures taken in this central area (doping variation) specifically influence the fundamental mode.

Also in the arrangement according to FIGS. 1 to 4 variations of the refractive index and/or the magneto-optical constant can be introduced in a corresponding manner in the central area of the magneto-optical waveguide structure 1.

In the case of variations of the magnetic field strength, only the value of the non-reciprocal phase difference is changed so that the magnetic field strength is preferably suitable for adjustment. A further means to selectively influence the non-reciprocal phase differences is a mechanical stress, likewise in the direction of the arrow 2 influencing the magneto-optical waveguide structure 1 or 11.

The dimensions L and B can be predetermined and the magneto-optical waveguide structures 1 and 11 can be suitably doped by means of methods known from literature, whilst iterative computing methods are required and conventional for such arrangements.

An ultimate optimization should, however, be realized by means of experiments, for which different specimens can be constructed whose structure is varied with respect to the computed values. The required mathematical and physical means and teachings are known to those skilled in the art from a multitude of publications and books. Reference is made to, for example, the book "Integrated Optics: Theory and Technology", Berlin, Heidelberg, New York, 1982 and "Applied Optics", Vol. 23, no. 1, 1984.

What is claimed is:

1. A non-reciprocal optical element, particularly for use as an isolator or circulator, and for connection to at least two monomode optical waveguides and which has a magneto-optical waveguide structure intended to be subjected to a transverse magnetic field directed perpendicularly to the direction of propagation of the optical wave, comprising:
   the magneto-optical waveguide structure being formed as a multimode waveguide which can propagate at least one fundamental mode and the first-order mode, the optical waveguides are located off-center with respect to the waveguide structure, at least one of the dimensions and the cross-sectional distribution of the refractive index of the optical waveguide structure is chosen to be such that the two modes have a reciprocal phase difference of $\pi/2 + 2n\pi$ and at least one of the magnetic field strength and the structure of the magneto-optical waveguide structure is chosen to be such that the two modes have non-reciprocal phase difference of $\pi/2 + 2m\pi$ and in which n and m may be integers including 0.

2. An arrangement as claimed in claim 1, characterized in that the magneto-optical waveguide structure is adapted to be influenced by a mechanical stress acting perpendicularly to the direction of propagation of the optical wave.

3. An arrangement as claimed in claim 1, characterized in that the magneto-optical waveguide structure consists of yttrium iron garnet (YIG).

4. An arrangement as claimed in claim 1, characterized in that the magneto-optical waveguide structure is provided on a substrate area and is approximately twice as wide as the monomode optical waveguides connected to it.

5. An arrangement as claimed in claim 1, characterized in that the magneto-optical waveguide structure is provided on the substrate at a height corresponding to approximately twice the height of the monomode optical waveguides connected to it.

6. An arrangement as claimed in claim 1, characterized in that in the device functions as a circulator and the magneto-optical waveguide structure is bilaterally connected to two monomode optical waveguides.

7. An arrangement as claimed in claim 1, characterized in that for use as an isolator each side of the magneto-optical waveguide structure is connected to a monomode optical waveguide essentially covering a peripheral half of the cross-sectional area of the magneto-optical waveguide structure, whilst the uncovered cross-sectional areas are provided with an absorbing layer.

8. An arrangement as claimed in claim 1, characterized in that a doping which is different from the neighbouring peripheral areas is applied in the central portion of the cross-sectional area of the magneto-optical waveguide structure in order to locally vary at least one of the refractive index and the magneto-optical constant in order to selectively influencing the fundamental mode.

* * * * *